United States Patent
Nash et al.

(10) Patent No.: US 10,589,172 B1
(45) Date of Patent: Mar. 17, 2020

(54) EMBEDDING METADATA IN RENDERED CONTENT

(71) Applicant: Amazon Technologies, Inc., Reno, NV (US)

(72) Inventors: Brent Ryan Nash, Ladera Ranch, CA (US); Christopher Talucci, Costa Mesa, CA (US); Drew Repasky, Anaheim, CA (US); Syed Suhaib Sarmad Barbero, Lake Forest, CA (US); Christopher Navin Stewart, Lake Forest, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 134 days.

(21) Appl. No.: 15/714,705

(22) Filed: Sep. 25, 2017

(51) Int. Cl.
| | |
|---|---|
| *A63F 9/24* | (2006.01) |
| *A63F 13/52* | (2014.01) |
| *A63F 13/25* | (2014.01) |
| *A63F 13/35* | (2014.01) |
| *A63F 13/92* | (2014.01) |
| *G06T 9/00* | (2006.01) |

(52) U.S. Cl.
CPC ............. *A63F 13/52* (2014.09); *A63F 13/25* (2014.09); *A63F 13/35* (2014.09); *A63F 13/92* (2014.09); *G06T 9/00* (2013.01)

(58) Field of Classification Search
CPC .. G06T 9/00; A63F 13/25; A63F 13/35; A63F 13/52; A63F 13/92
See application file for complete search history.

(56) References Cited

U.S. PATENT DOCUMENTS

| | | | | | |
|---|---|---|---|---|---|
| 5,946,414 | A | * | 8/1999 | Cass | G06T 1/0021 |
| | | | | | 382/183 |
| 6,069,636 | A | * | 5/2000 | Sayuda | G06T 1/0021 |
| | | | | | 345/589 |
| 7,222,235 | B1 | * | 5/2007 | Mitsui | G06F 17/211 |
| | | | | | 380/28 |
| 7,551,750 | B2 | * | 6/2009 | D'Amato | G03H 1/0011 |
| | | | | | 216/22 |
| 2003/0012403 | A1 | * | 1/2003 | Rhoads | G06F 16/487 |
| | | | | | 382/100 |
| 2004/0060990 | A1 | * | 4/2004 | Hilton | G06K 9/18 |
| | | | | | 235/494 |

(Continued)

*Primary Examiner* — Steve Rowland
(74) *Attorney, Agent, or Firm* — Hogan Lovells US LLP

(57) ABSTRACT

Useful metadata can be embedded directly into dynamically rendered content in a way that is minimally perceptible to a viewer. Objects to be rendered for an application, such as backgrounds and gameplay elements for a gaming application, can have their appearance modified in order to embed specified metadata. The modifications can impact the color, patterns, configuration, or other aspects of the objects. The metadata can include any data useful for identifying a state, context, or configuration for the presentation of content, such as the state of a game at the time of rendering, as well as information about the player or device corresponding to a device-specific rendering of the content. A video segment including a representation of the rendered content can be analyzed to quickly identify and extract the metadata, which can help to quickly obtain the information needed to perform certain tasks, such as debugging or issue spotting.

20 Claims, 8 Drawing Sheets

(56) References Cited

U.S. PATENT DOCUMENTS

| | | | |
|---|---|---|---|
| 2005/0041120 A1* | 2/2005 | Miller | H04N 1/00127 348/239 |
| 2005/0069171 A1* | 3/2005 | Rhoads | G06Q 30/02 382/100 |
| 2005/0151854 A1* | 7/2005 | Maki | H04N 1/00326 348/222.1 |
| 2007/0078706 A1* | 4/2007 | Datta | G06Q 30/02 705/14.5 |
| 2008/0025561 A1* | 1/2008 | Rhoads | G01C 11/00 382/100 |
| 2009/0210301 A1* | 8/2009 | Porter | G06Q 30/02 705/14.54 |
| 2009/0231455 A1* | 9/2009 | Emery | H04N 1/32203 348/222.1 |
| 2009/0262975 A1* | 10/2009 | Rhoads | G06F 21/10 382/100 |
| 2010/0029380 A1* | 2/2010 | Rhoads | A63F 13/10 463/29 |
| 2012/0148088 A1* | 6/2012 | Mital | G06T 11/206 382/100 |
| 2015/0003668 A1* | 1/2015 | Carper | G06T 1/0028 382/100 |
| 2015/0242737 A1* | 8/2015 | Glazberg | G06Q 30/0185 235/435 |

* cited by examiner

EMBEDDING METADATA IN RENDERED CONTENT

BACKGROUND

An increasing number of players are accessing game content electronically, such as through online gaming services. People are also increasingly sharing information electronically through various mechanisms, including the posting of digital video clips showing content such as gameplay of a particular player. This has been beneficial to game designers, as users can post or submit videos showing an issue or problem with a game, and the game designer can use information submitted by the user to determine information useful in debugging the problem. Due to the variety of devices, operating systems, and possible configurations, as well as the various potential states of a game, it can be necessary to obtain a significant amount of information in order to be able to properly identify the issue. While user information in the message or video might enable a specific piece of information to be obtained, such as a user identifier, the process of attempting to determine the other relevant information can be quite resource intensive, and can be a lengthy manual process in many cases. This increases the cost and difficulty in addressing issues with games and other such digital applications.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the encoding of data into rendered content. In particular, various approaches embed relevant data into the rendered content in such a way that is minimally perceptible to a viewer of the content, but robust to compression and other potential modifications. Objects to be rendered for an application, such as backgrounds and gameplay elements for a gaming application, can have their appearance modified in order to embed specified metadata. The modifications can impact the color, patterns, configuration, or other aspects of the objects. The metadata can include any data useful for identifying a state, context, or configuration for the display of content, such as the state of a game at the time of rendering, as well as information about the player or device corresponding to a device-specific rendering of the content. A video segment including a representation of the rendered content can then be analyzed to quickly identify and extract the metadata, which can help to quickly obtain the information needed to perform certain tasks, such as to perform a debugging or issue spotting for the application, or verify a veracity of the rendered content in the video data, among other such options.

Various other functions can be implemented within the various embodiments as well as discussed and suggested elsewhere herein.

Figure 1A:
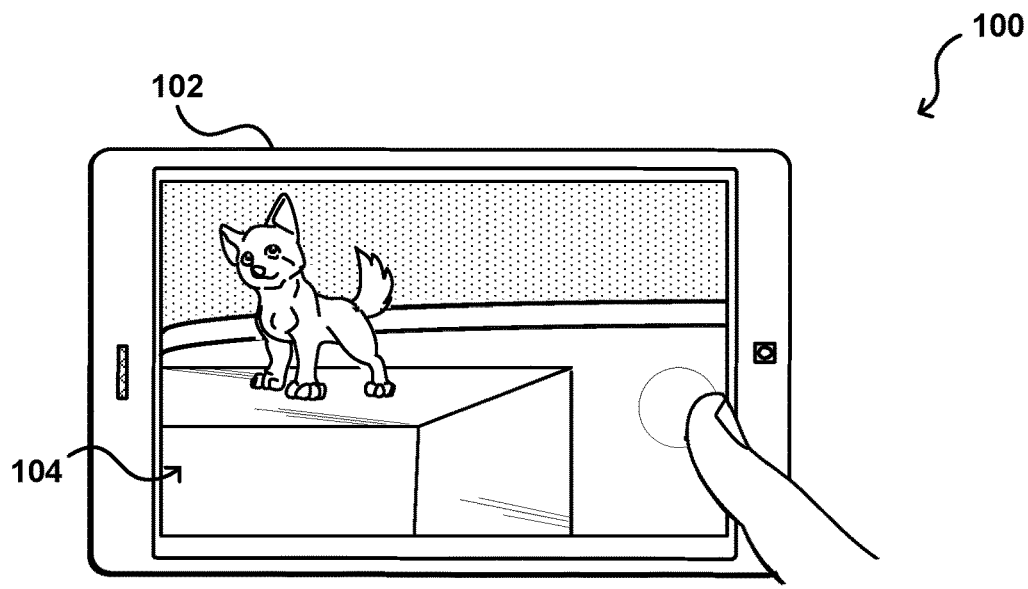
FIGS. 1A and 1B illustrate captured gameplay that can be submitted and analyzed in accordance with various embodiments.

As mentioned, various types of electronic gaming are available, which oftentimes involves the installation and execution of a gaming application on a computing device. Various other gaming and rendered content options can be utilized as well within the scope of the various embodiments, such as may utilize a game application executing on a central gaming server or other such approach. As illustrated in the example configuration 100 of FIG. 1A, conventional game content includes graphical content 104 that is rendered for display on a display element of, or in communication with, a computing device 102. Although a portable computing device (e.g., a smartphone, a portable gaming device, or a tablet computer) is illustrated, it should be understood that any device capable of processing and/or displaying game content can be used in accordance with various embodiments discussed herein. The devices can include, for example, notebook computers, electronic book readers, personal data assistants, cellular phones, video gaming consoles or controllers, television set top boxes, wearable computers (e.g., smart watches, contacts, or glasses, and portable media players, among others. In this example, a user is able to provide input to the game through one or more input mechanisms, such as a touchscreen, button array, microphone, camera, or keyboard, and that input will be processed according to the gameplay rules of the application. Various other approaches for providing electronic game content can be utilized as well within the scope of the various embodiments.

During a gameplay session, it is possible that a player will have a question or experience a problem for which the player would like to obtain assistance. Using conventional approaches, the player would submit an email message, bug report, or blog post with information that could be useful in obtaining an answer or pointing out a potential issue with the game. An appropriate person, such as a game developer or tester, may use this information to attempt to provide the desired outcome. If the issue is a problem with the game, the developer can use the information to attempt to identify relevant data useful in identifying the source of the problem. This data can include, for example, the level or state of the game, the particular game session, actions that have occurred in the game session, information about the player and player character, information about the device on which the issue was experienced, and the like. Oftentimes, however, this data is located in various different locations. Further, the type of information provided by the player can vary, which can make it difficult to determine even the most basic data to attempt to identify the problem. The process thus can be very time consuming, as well as being costly and resource intensive.

Figure 1B:
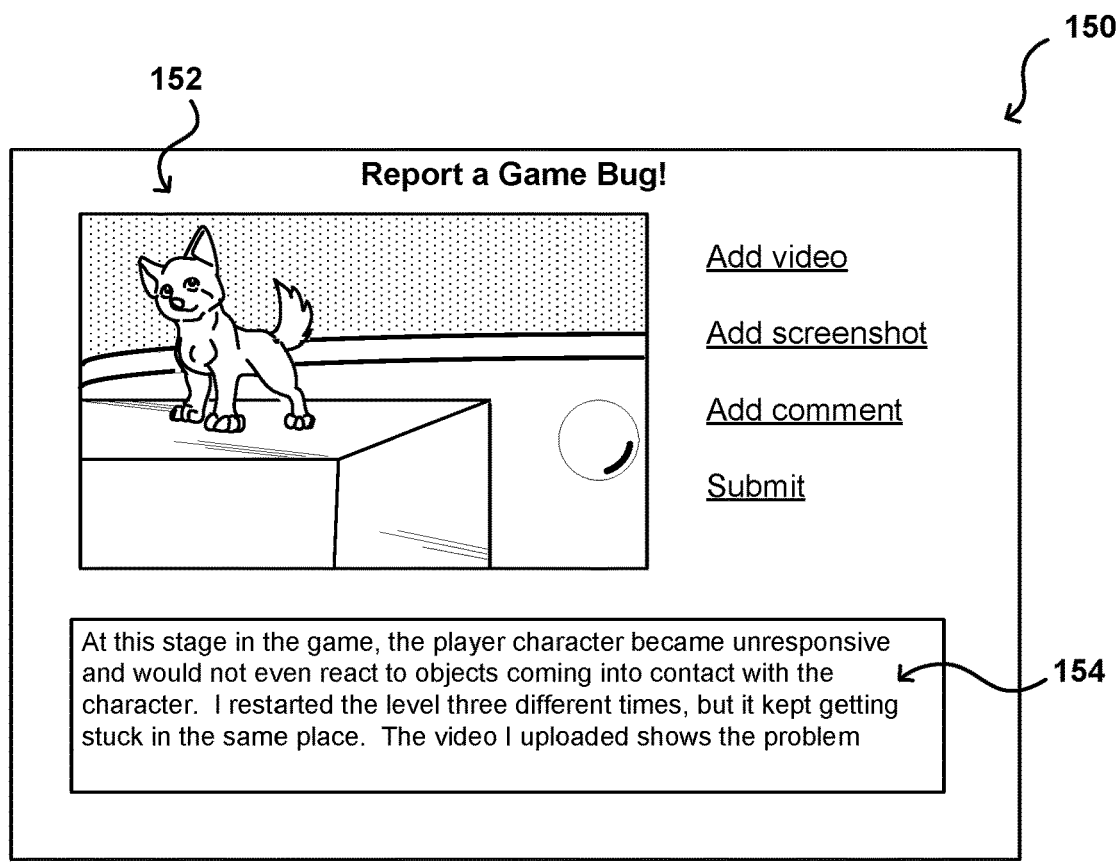

In approaches in accordance with various embodiments, a player (or other user) can submit a bug report, question, or other issue through an interface 150 or other mechanism, such as is illustrated in the example of FIG. 1B. Through such an interface, the user can submit (or link) a video clip 152 showing a portion of the gameplay exhibiting the problem, or at least corresponding to a portion of the gameplay during which the problem was experienced. The user can also submit comments 154 or other information useful in identifying the problem. This can help the developer (or other recipient) to more quickly understand the question, problem, issue, or other topic of the submission. It will still be the case, using conventional video and text submissions, that a party assigned to the issue will have to perform some amount of research to determine the game state information, player and device information, and/or other information necessary or at least useful in diagnosing the problem.

Accordingly, approaches in accordance with various embodiments can encode information into the displayed image, video, or other gameplay data that can then be extracted from a video or other clip or representation of the gameplay. This can include, for example, rendering content with the desired information embedded such that even upon a certain amount of compression or other processing used to post the video to a social media site, for example, the information can be retrieved and decoded. As mentioned, players are often uploading gameplay video clips to services such as Twitch and YouTube, and these videos can be attached or linked to reports submitted by various users. Further, a developer coming across such a video and seeing a problem can quickly obtain the necessary information from the video that can be used to diagnose the problem or issue.

Such an approach is enabled in part by the fact that the rendering of content for gaming, augmented reality (AR), and other such applications can be unique for each device having a view of the gameplay data. Thus, the content displayed to each user, or on each device, can be customized. While some data, such as game state data, may be the same for each player to a multiplayer game, there can be user- or device-specific data that can be useful to encode as well. For example, information about the player or device may be useful in diagnosing an issue that was only experienced by a particular player or on a particular device, or type of device. Thus, some embodiments can incorporate one or more pieces of data common amongst the players, such as a game session identifier, as well as one or more pieces of unique or specific data, such as a player or device identifier. In some embodiments the amount of data encoded may be minimal, such as a single data record that might point to a table that includes all relevant information, as may be updated during gameplay. In other embodiments it may be desirable for the content to encode the information needed without reference to another table or source, such that the gameplay content itself can be useful to diagnose the issue. Various other approaches or combinations can be used as well as discussed and suggested herein.

In various embodiments, the information can be embedded or encoded in the rendered gameplay data in a way that is imperceptible to players, or at least does not cause distraction or is barely perceptible so as to not take away from the gameplay experience. Various watermarking approaches can be used to embedded information in specific rendered frames. Such an approach may be susceptible to data loss during compression, however, and may not be optimal for use in encoding the desired information for video to be submitted by various users using different video compression and encoding. It therefore can be desirable in at least some embodiments to encode relatively small amounts of data, such as may relate to a session or match identifier, player identifier, and timestamp, for example, that can be encoded imperceptibly into the gameplay data. As would be understood to one of ordinary skill in the art in light of the teachings and suggestions contained herein, the amount of data that can be encoded in such data can depend upon factors such as resolution, number and type of gameplay objects, amount of gameplay motion, type of game or content, and the like.

In various embodiments, a subset of the content rendered on the screen at any given time, or for any given frame, can be rendered so as to encode at least some amount of data. FIGS. 2A through 2F illustrate example approaches for encoding or embedding game- or content-relevant data that can be utilized in accordance with various embodiments. For example, in the situation 200 of FIG. 2A a bush or plant is to be rendered in a scene. One or more aspects of the plant can be variable in order to encode information. For example, there may be a set of leaves to be rendered on the tree, where each leaf can be one of multiple colors. For a binary encoding each leaf may be either a first color or a second color, although additional colors can be used as well to correspond to additional options. A larger number of available colors can potentially make the decoding more difficult as small changes in color may occur during the video encoding and/or compression stage(s). In this example specific leaves on the plant 202 rendered on a first device can be set to specific colors in order to encode a specific data value. When compared to the same plant 212 illustrated on a second device, according to the view 210 of FIG. 2B, it is illustrated that the placement and shading of the set of leaves is different, which can be used to encode different information. Two states per leaf across ten leaves would yield 1,024 different enumerations alone within that single bush. Further, aspects such as the location and size are different, which can also be used to encode additional data. Such an approach can be robust to video compression and other processing by a third party process. Further, because the information is embedded in the content that is rendered instead of added through a watermarking or similar process, the data would be difficult for a third party process to detect and/or remove. Further still, while the differences may be apparent when viewed side-by-side, a view of any one of the plants individually would make it imperceptible to detect that any information is encoded in the plant, or that any device-specific rendering has occurred.

Figure 2A:
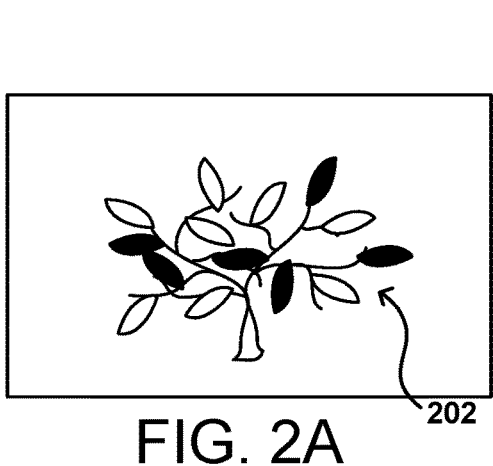
FIGS. 2A, 2B, 2C, 2D, 2E, and 2F illustrate example approaches to encoding or embedding metadata into rendered content that can be utilized in accordance with various embodiments.
Figure 2B:
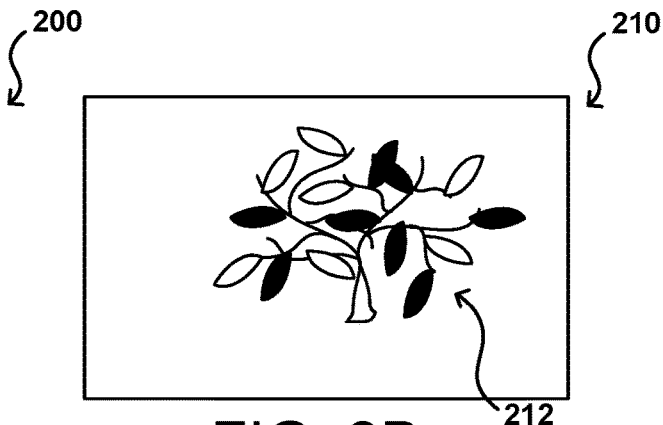
Figure 2C:
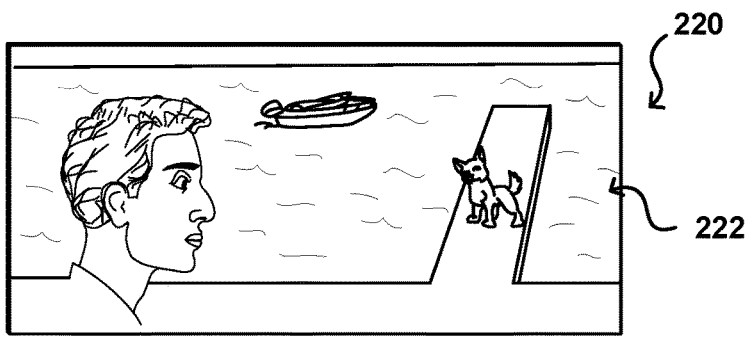
Figure 2D:
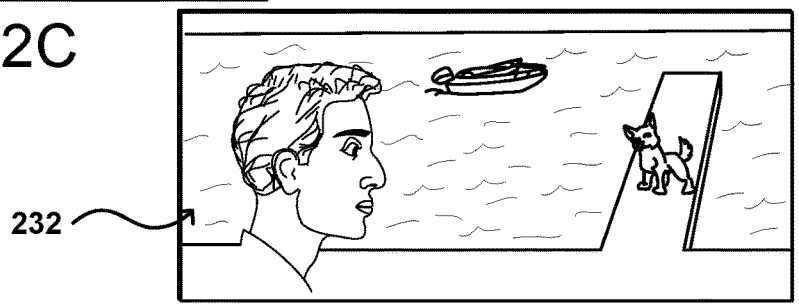
Figure 2E:
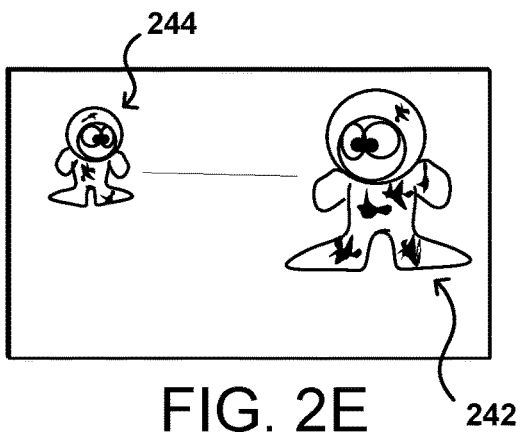

FIGS. 2C and 2D illustrate another example encoding that can be used in accordance with various embodiments. FIG. 2C illustrates a first view 220, and FIG. 2D a second view 230, of the same state of gameplay rendered on two different devices. As illustrated, the waves on the water differ in various ways, which can be used to encode data. For example, the direction in which the waves are moving is different, as well as the size and shape of the waves. The frequency of the waves, or distance between successive waves, is also different. The color of the water or other aspects can also be used to encode information. For these or other examples, the data simply needs to be encoded in a way that can be accurately detected, extracted, and/or decoded from video (or even still images) of the gameplay. There can be various aspects that are variable, and the respective values of those aspects representative of the data. For example, a selected set of wave shapes, the number of waves, the direction of the waves, and the speed of the waves can be used to encode four to six pieces of information, which may be sufficient to encode a timestamp for the gameplay (i.e., the timestamp 14:34:30 can be encoded using three to six pieces of data in different embodiments).

Various other aspects of the gameplay content can be modified to encode different types of data as well. For example, in the image 240 of rendered content in FIG. 2E, the pattern, style, materials, and/or colors of clothing selected for various characters can be used to encode information. For example, a first character 242 has a distinctive set of patterned elements on the character's outfit, which can each correspond to a different piece or value of data. Similarly, the colors and placement can be used to encode information as well. Data can similarly be encoded using visual elements rendered for the second character 244. Since each player device renders a unique view, it might be the case that each character visible has a different appearance in order to encode the respective device-specific data. In some embodiments, certain characters might have the same appearance, to encode game- or session-specific data, while other characters or objects might have a slightly different appearance, in order to encode player- or device-specific data. As mentioned, these differences would primarily be detectable to a human only if viewing the rendered output for two different devices on the same session. In some embodiments a mapping may be used to track the selection or configuration of objects to associated values, while in other embodiments encoding schemes can be used where each of a set of opportunities corresponds to a value subject to the encoding scheme.

Figure 2F:
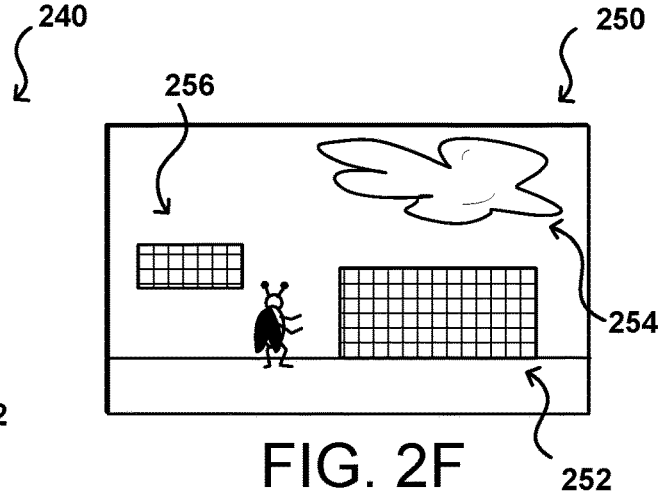

FIG. 2F illustrates yet another example frame 250 wherein information is encoded into the background elements of a game. This can include, for example, the size, shape, and number of clouds 254 in the sky, the patterns used for various platforms or scene elements 252, 256, or the patterns used to fill those elements, among other such options. Further, the relative size, height, and placement of some elements can be used to encode information, although the varying of gameplay elements such as platforms and interactable objects may be undesirable, as different players will end up with games and tasks of differing difficulty. Such an approach can be beneficial for some games, such as side-scrolling games, as at least some elements of background will be available in each scene, frame, or view, such that the information will be readily available. A potential downside to rendering specific elements to encode data is that those elements will generally only be in the field of view of a virtual game camera for a limited period of time. This can be managed by ensuring that at least one gameplay element includes the encoding for each frame of gameplay rendered. A more simplistic approach may be to encode the information in the background patterns, elements, or style in order to ensure that this information is visible at all times. Such an approach, however, may limit the ability to update information, as continual changes in the background may be detectable or distracting to players. As mentioned, the background elements may be used to encode information that will not vary during a level, while other gameplay elements to be rendered at specific points in the scene can be used to encode variable data. The same elements on a character or element can vary throughout a particular scene or level, but may only change between appearances so that the information is properly encoded but the change is not rendered and thus generally not perceptible to the player.

In addition to use for testing and debugging, information can be embedded in the rendered content for other purposes as well. For example, various users post videos to demonstrate their particular skill or ability at a certain game, such as to complete the level under a certain time or without using a specific option. The ability to embed information in a specific rendering of the game can be used to verify the veracity of video content. For example, the game can be configured to encode whether any special code, cheat, or ability is being utilized during that portion of gameplay. Further, the data can be used to cross-check against gameplay data stored for that session to ensure that the gameplay is legitimate and not something rendered or altered outside the gaming context. Gameplay tournament organizers, coaches, and players can benefit from the ability to easily ascertain the veracity of gameplay to ensure players are not cheating or otherwise unfairly manipulating the game. The gameplay veracity argument is important for other gaming endeavors such as speed-running as well, where players vie for world records on performing gaming tasks as quickly as possible (e.g., via Twin Galaxies or Awesome Games Done Quick).

Accordingly, approaches in accordance with various embodiments can embed metadata and telemetry into the live rendering of video game content, in a way that is not easily perceptible by the player. Such embedding of data can provide for after-the-fact consumption to perform tasks such as debugging issues or verifying the validity of gameplay. In a video game, for example, the exact audio and/or visual content is highly unique to the player (or device) playing the game, and can be customized for the respective individual experience. Each player has agency and can control aspects such as player movement, camera positioning, etc., so that it is highly unlikely that any two players ever view exactly the same gameplay content. Secondly, video games have complete control of rendering all aspects of a player's view and therefore have many more techniques available for encoding information than other media. These techniques for encoding information include: rendering metadata (e.g., individual values or a QR code) every Nth frame; using color shifting, gradient or dithering techniques on visual elements in the game (user interfaces, environments, etc.); manipulating elements of the world such as the position, movement, and motion frequency of 3D dimensional entities (e.g. NPCs, particles, etc.); and using audio shifts or cues (potentially in the ultrasonic or subsonic range), among others. The data can be determined and embedded dynamically, using one or more of these techniques at the time the gameplay is rendered. Such content can be consumed after the fact, however, such as when a QA team analyzes a video clip of a potential bug or when a speed run judge wants to verify the veracity of a submission. This analysis can be facilitated by various tools, as may be provided as a companion to the information embedding code. These tools can have the ability to be fed gameplay multimedia (e.g., still images, audio clips, video clips, etc.)

and return the data from the embedded information. For instance, a game might encode information about a user's computer hardware (CPU, graphics card, memory, etc.) such that when a video clip is analyzed to investigate a bug, this information can be easily extracted. Other examples of information that could be encoded and extracted later include: the specific state of the player (x/y/z position, camera angle, mission state, non-player character (NPC) state), telemetry information (lifetime in-game stats, hours played, etc.), performance information (frame rate, CPU usage, etc.), presence or absence of the use of cheat tools or known in-game exploits, embedding player identifying information to find the source of broken Non-Disclosure Agreements, and running a type of Cyclic Redundancy Check from frame-to-frame to ensure consistency. Various other selections and types of data can be encoded and retrieved as well within the scope of the various embodiments.

Various other encoding approaches can be used in addition to those already discussed herein. For example, different color palettes can be used between players for the same stage or level, which can be indicative of different values or settings. In some embodiments a color palette can be shifted by a determined amount in order to encode one or more corresponding values. The decoding of such information can involve comparing the rendered color values to a specific template or base reference. In some embodiments there may be one reference color of the palette that does not change, in order to allow for a calibration or ability to count for any color shifts due to compression or other such processes. In some embodiments one or more dithering techniques can be used such that the gameplay elements look as expected at a macro level, and with only small differences being detectable. Various aspects of any game content can be used to encode information, as may relate to the presence, size, location, frequency, or other aspects of gameplay elements. This can even involve setting the way in which the grass sways or particles move about a scene, where variations between players would generally be imperceptible, but patterns of grass or particle movement can be used to encode a significant amount of information.

In some embodiments the data embedded may be more perceptible, but done in a way that should not be substantially distracting. For example, if a game is rendered at 60 Hz then displaying information on a specific frame would only cause that information to be available for about 16 ms, which would be difficult for a player to detect. The player might notice something flash on the screen, but would not be able to determine what it was or included. A potential downside to such an approach is that someone can stop the video playback on that frame to view the information, and such an approach provides insight into the process and a location at which a malicious actor can potentially modify the content to adjust the values. Information can also be embedded in the audio data for a specific device or player, using ultrasonic or subsonic approaches that would barely be perceptible to users. These sound effects can further be aligned with peaks in the background music to make the difference harder to detect. Slight differences in sound effect timing can also be used to encode data, as well as intentionally speeding up or slowing down the background music as a form of frequency compression. Audio data can be particularly susceptible to compression, however, which may make it less reliable or useful than other visual approaches discussed and suggested herein.

In some embodiments the ability to use various types of encoding can impact the amount of data encoded. For example, certain types of game use standard backgrounds or have many types of elements available, such that there are several opportunities within each frame. For other games there may be very few opportunities, or the opportunities may not be available consistently. Thus, in some embodiments the data can include a single data value, such as code, record, or identifier, that can be used to look up information in one or more tables or repositories. For other embodiments the data can include any or all information discussed herein, such as session identifier, player identifier, device characteristics, and the like, as well as other information such as information about tasks already completed, current abilities, current objectives, and the like. In some embodiments models for gameplay elements may be generated that enable the encoding of specific values. In other embodiments, random numbers might be injected currently to provide for certain actions, such as the movement of grass or particles, but specific numbers could be injected instead to encode certain information without having to significantly change or modify the game code, models, or other aspects. Other examples of data that can be embedded into rendered content include an installed operating system (OS) version, a graphics card installed, temporal information, game oriented metadata relating to a round or level identifier, a position in the world, camera angle, and the like. Other types of technical information can be embedded as well, as may relate to an amount of available or utilized memory, storage, processor, or network capacity. Static information such as player identifier and session identifier may be encoded in the background or other such elements as discussed herein.

In some embodiments the embedded data can also include some validity data. For example, the embedded data can include a hash or checksum according to a specific protocol for representing the data. A minor cyclic redundancy check (CRC) or other error-detecting code can be used to verify the basic information in some embodiments. Since the data in many embodiments will not be encrypted or provided in a piece-wise fashion, however, such approaches may not be particularly useful or worth the additional encoding, as the more data that is encoded the more perceptible it may become. Further, since the information will be sent repeatedly for successive frames it will generally be relatively straightforward to identify any individual incorrect values.

In some embodiments the type(s) of encoding used can vary based upon any of a number of different factors. For example, remote configuration may be configured to analyze network and other performance conditions and adjust the encoding accordingly. For example, if the game is running slower than intended, the amount of encoding or rendering used may be decreased to attempt to increase performance. Further, if there is network congestion then in some embodiments the game may render more information into the content itself than would otherwise be rendered, instead of linking to a game state table or other such repository. Further, if the amount of information to be encoded changes during a gaming session, such as where more encoding is needed than is available or where there is more encoding being performed than necessary, then the encoding approach can be adjusted dynamically in order to set the amount and/or type of encoding to the appropriate level. As mentioned, an increase in data encoded can increase resource requirements as well as increase perceptibility, such that it can be desirable to utilize the minimum amount of data encoding as necessary in some embodiments. Further, in some embodiments a game application or server might be able to detect issues with the game, which might cause more data, or a different set of data, to be encoded to help assist with the issue identification and rectification process.

In some embodiments a developer can flag models that can be used to encode information, or can build the models to provide such support. In other models a gaming engine can make such determinations dynamically during gameplay to ensure sufficient data embedded in the rendered content. For example, a mesh or slice can be configured so as to be modifiable through the gaming engine. In some embodiments the data can also be rendered redundantly using multiple approaches, such that the odds of the data being embedded into any particular scene are increased. As mentioned, some approaches can analyze the content to be rendered to ensure the data is embedded into each frame, but in other approaches the data may be embedded into content in such a way that any clip of video is likely to include the information without the additional verification overhead. In some embodiments, the data rendered can also change if, for example, it is detected that no network connection is available and/or the player is playing the game offline, such that the necessary information is embedded into the rendered content itself without reliance upon a data link or other such mechanism.

Figure 3:
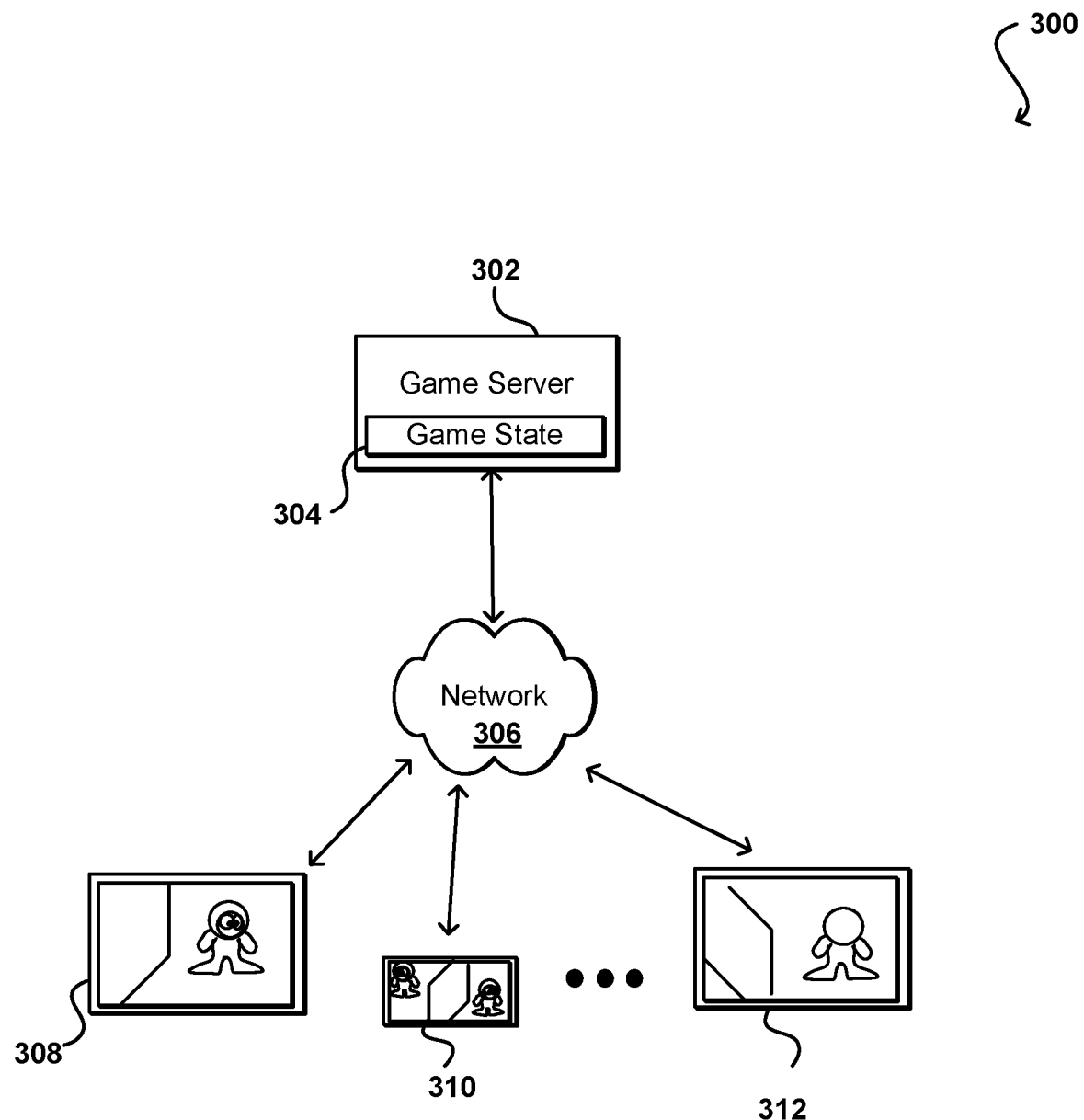
FIG. 3 illustrates players to a multiplayer online gaming session that can be developed in accordance with various embodiments.

FIG. 3 illustrates an example gaming configuration 300 that can be managed in accordance with various embodiments. In this example, a gaming application is hosted on at least one game server 302. The game server 302 can be a local gaming machine or a remote server operated by a game provider, among other such options. In this example the game offers multiplayer capability, whereby multiple players can utilize respective devices 308, 310, 312 to connect to the game server 302 over at least one network 306, such as the Internet, a local area network, a dedicated gaming network, a peer-to-peer network, or a cellular network, among other such options and combinations thereof. The players can join in a session of the game with state data that is managed by a game state component 304 of the game server. In some embodiments one or more game servers 302 can execute the game, while in others the servers can manage game state for instances of the game executing on the various player devices 308, 310, 312. These devices can include specific gaming devices, such as gaming consoles or handheld consoles, or other computing devices such as smart phones, tablet computers, wearable computers (e.g., smart glasses or watches), desktop or notebook computers, and the like. State information can be transmitted to the gaming server 302 at appropriate times, such as periodically, in response to certain actions or occurrences in the game, in response to requests from the server, or at other appropriate times. The game server can maintain the state information such that the game state is consistent across the various devices, as well as to enable a saving or restoring of the game for any or all of the devices.

In many instances, a first player will submit a request to join a session of a specified gaming application supported by the game server 302. If there is an existing game session for which the player qualifies, such as by having an appropriate skill level or qualification, then the player can be added to the existing game session. If there is no existing game session for which the player qualifies, or if games can only be joined before the session starts, then the request can trigger the initiation of a new session for the game. In some embodiments the new session can begin immediately, while in other embodiments or for specific games there might need to be a specified number, minimum number, or quorum of players for a session before the session can begin. For example, if a game requires ten players then a session might not start before ten players have joined, with the first nine players having to wait at least until a tenth player joins. In some cases additional players can join during a session, such as up to a maximum number of players in some embodiments, while in others players may not be able to join, or may only be able to join if a current player leaves the session, etc.

Figure 4:
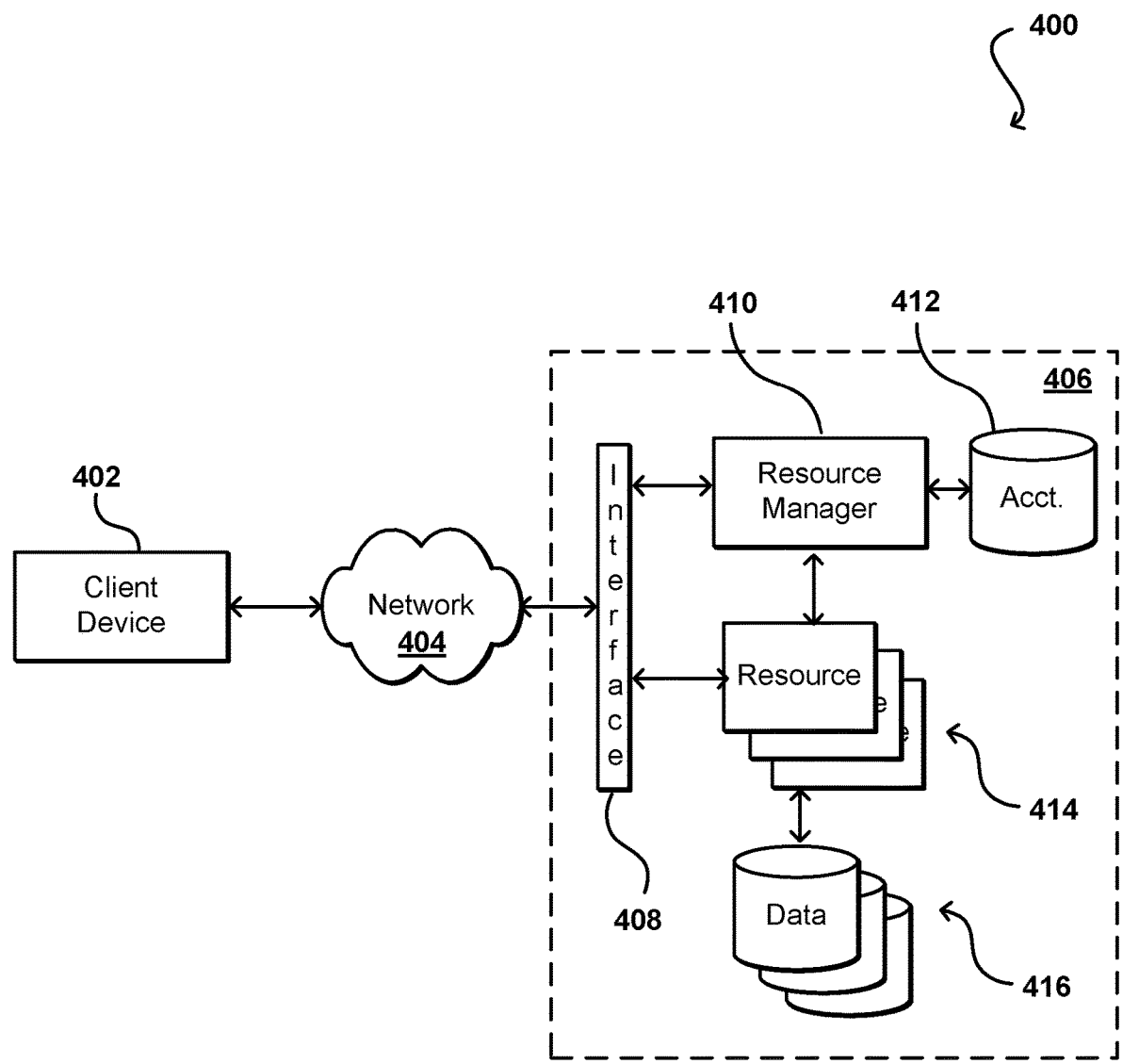
FIG. 4 illustrates an example environment in which various embodiments can be implemented.

FIG. 4 illustrates an example environment 400 in which aspects of the various embodiments can be implemented. In this example a user is able to utilize a client device 402 to submit requests across at least one network 404 to a multi-tenant resource provider environment 406. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 404 can include any appropriate network, including an intranet, the Internet, a cellular network, a local area network (LAN), or any other such network or combination, and communication over the network can be enabled via wired and/or wireless connections. The resource provider environment 406 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 414 of one or more types. These types can include, for example, application servers operable to process instructions provided by a user or database servers operable to process data stored in one or more data stores 416 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 414 can submit a request that is received to an interface layer 408 of the provider environment 406. The interface layer can include application programming interfaces (APIs) or other exposed interfaces enabling a user to submit requests to the provider environment. The interface layer 408 in this example can also include other components as well, such as at least one Web server, routing components, load balancers, and the like. When a request to provision a resource is received to the interface layer 408, information for the request can be directed to a resource manager 410 or other such system, service, or component configured to manage user accounts and information, resource provisioning and usage, and other such aspects. A resource manager 410 receiving the request can perform tasks such as to authenticate an identity of the user submitting the request, as well as to determine whether that user has an existing account with the resource provider, where the account data may be stored in at least one data store 412 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 402 to communicate with an allocated resource without having to communicate with the resource manager 410, at least until such time as a relevant aspect of the user account changes, the user is no longer granted access to the resource, or another such aspect changes.

The resource manager 410 (or another such system or service) in this example can also function as a virtual layer of hardware and software components that handles control functions in addition to management actions, as may include provisioning, scaling, replication, etc. The resource manager can utilize dedicated APIs in the interface layer 408, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 408 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 5:
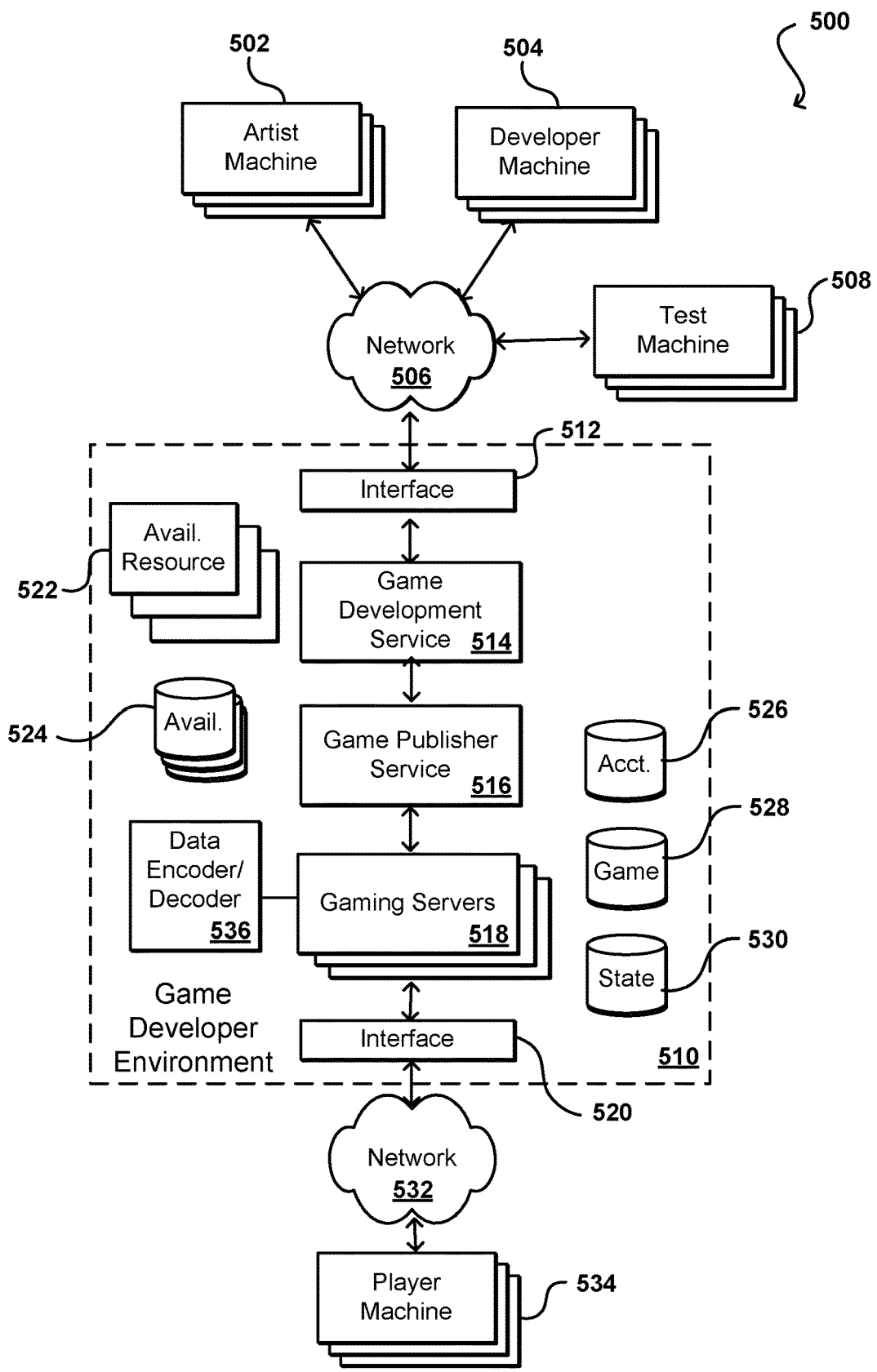
FIG. 5 illustrates an example gaming pipeline that can be used in accordance with various embodiments.

As illustrated in the example system 500 of FIG. 5, at least some of the resources can be used to support platforms and services useful in the development and providing of electronic gaming and three-dimensional graphical content, among other such options. For example, the artist machines 502 and developer machines 504 can collaborate via a game development service 514, which can be provided by a set of resources in a game developer environment 510, or other such resource environment, that are able to scale dynamically as discussed above. It should be understood that artists can fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 528, where the repositories can include graphics files, code, audio files, and the like. The game development service 514 can also work with an account manager, or at least maintain information in an account data store 526, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like.

Once the game development reaches an appropriate stage in the development cycle or pipeline, as may relate to alpha or beta testing, actual release or updating, etc., the appropriate content can be made accessible to a game publisher service 516. The game publisher service 516 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 504 or otherwise. In some embodiments the game content might be published and made available to one or more test machines 508, which may be associated with the customer, such that the customer can test various builds or versions of the game. In some embodiments feedback provided by the test machines 508 may be provided to the game development service 514, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 518 which can run the game and enable player machines 534 to access the game content over one or more networks 532, which may be different from the network(s) 506 used for game development. This can include, for example, dedicated gaming networks, the Internet, cellular networks, and the like. The player machines 534 can communicate with the appropriate interfaces of an interface layer 520 to obtain the gaming content. In some embodiments the player machines 532 will download the gaming content for execution on the individual machines, and will upload (or otherwise communicate) gaming data, messages, and other information to the gaming servers 518, as well as to other players, social networking sites, or other such recipients. The gaming servers 518 can cause state information for the various instances of the game to be stored to at least one game state repository. This can hold state for the game as a whole or for individual game sessions, among other such options. As mentioned, in some embodiments the devices can send position or image data to a dedicated gaming server 518 or other component in the game developer environment 510, which can be aggregated and analyzed by a surface mapping component, or other such system or process, which can determine authoritative data for use in rendering augmented reality content. The authoritative data can include, for example, point cloud data, geometric primitives, location modeling, and the like. At least some of this data can be provided to the various player devices 534 in order for those devices to render the appropriate AR content for the location and orientation of a given device. In some embodiments the game content can be executed by the game servers and streamed in near real time to the player machines 534. In some embodiments there may alternatively be a mix of gaming content executed on the player machines and the gaming servers. Peer to peer connections among the player machines and other communications can be utilized as well in various embodiments.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function. A resource instance can be allocated to run a function in response to a customer request or event, and once the function has completed that instance can either be made available for processing a different event or destroyed, among other such options. In either case, the customer will not be charged for more processing by the instance than was needed to run the function.

As mentioned, the gaming servers 518 or other such systems, services, or components can utilize at least one data encoding and/or decoding service 536, for example, that is able to determine information to be embedded for a device-specific game rendering and cause that information to be embedded using one or more embedding approaches as discussed herein. In some embodiments the service can provide a console that can be used to define or select rules or guidelines for selecting embedding processes, as well as types of data to be embedded, among other such options. In some embodiments, this service will be used during game development to enable the game code to support dynamic embedding. In some embodiments, a gaming server 518 or player device 534 can contact the service to assist with the encoding or embedding of data, such as to determine the data to be embedded, approach to be used, etc. The decoding service can be used offline after the gameplay has occurred, for example, as video will have had to have been captured and submitted in at least some embodiments. The decoder service can identify and extract the data, and perform the necessary decoding or interpretation in order to provide the embedded data. This can be part of an automated or manual process, for example, such as may be used for testing, debugging, development, or QA purposes, among other such options.

Figure 6:
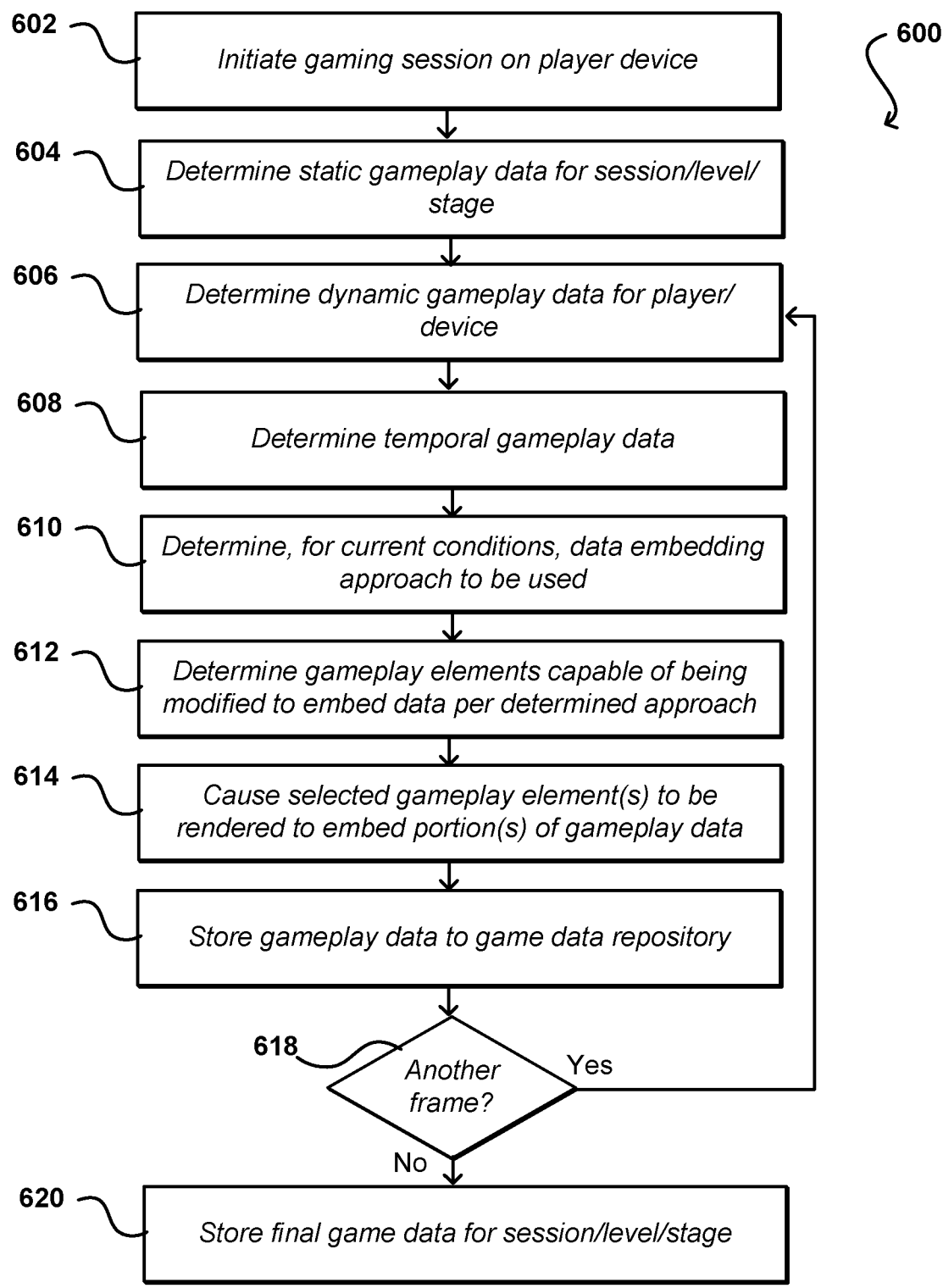
FIG. 6 illustrates an example process for encoding metadata in rendered content that can be utilized in accordance with various embodiments.

FIG. 6 illustrates an example process 600 for embedding game data in dynamically rendered content that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications are a primary example utilized herein, it should be understood that other types of applications or content can benefit from advantages of the various embodiments as well as discussed and suggested herein. In this example, a gaming session is initiated 602 on a player device. The session can be a multiplayer session involving multiple devices, or an individual session on the single player device, among other such options. Further, the game may be executed on the device, in the cloud, or using another such resource or combination thereof. The game may be a new session or a continuation of a prior session. Further, some games do not maintain official "sessions" such that a session as used herein may also refer to any period of time in which the game application is executing or active gameplay is occurring on at least one device, among other such options.

In order to provide information useful for gameplay testing, debugging, and other such purposes, at least some of the relevant data can be determined for embedding in the game content. In this example, the static gameplay data can be determined 604. Static gameplay data can include data that will not change during the current session, level, stage, or other such portion of gameplay. These can include, for example, information about the session itself, information about the current device being used to play the game, static information about the user such as identifying information, and the like. Dynamic gameplay data can also be determined 604, which can include information such as currently completed tasks, active quests or objectives, current network or device conditions, active cheat codes or abilities, or other data that may change throughout a session or level, etc. Temporal gameplay data can also be determined 606 in this example. Temporal game data can include data accurate for a point in time, such as a timestamp, progress point throughout the game, etc. Various other types of data can be determined as well. While the static data might be determined once at the beginning of a session or level, for example, dynamic information might be determined periodically or as updated, and temporal information might be continually updated, etc.

In order to embed the appropriate data in the gameplay content, this example process determines 610 at least one embedding approach to use for current conditions. The current conditions can relate to the type of game, gameplay, session, user, and the like, or can relate to operating conditions such as the load or available memory on the device, as well as networking conditions such as currently available bandwidth or throughput. Other condition information can be considered as well as discussed and suggested herein. There can be various data embedding approaches used as discussed herein, as may relate to the placement or configuration of three dimensional elements in a scene, patterns or colors of various gaming elements, behavior of objects rendered in the scene, sound effects or music generated with the game, etc. Once the appropriate embedding approach is determined, another determination can be made 612 as to the gameplay elements available, at least for the current scene or frame or content to be rendered or presented, and capable of being modified or generated to embed the data per the determined approach. For example, if the approach involves embedding data using the color or pattern of background objects then a determination can be made as to qualifying background objects. If the embedding approach is to utilize the configuration or selection of options for a gameplay object to be rendered using a three-dimensional model, then a similar determination of available objects can be made. As mentioned, in some embodiments an attempt can be made to locate a sufficient number of objects or features for embedding the relevant data in each frame or scene of game content. The selected gameplay element(s) can then be rendered 614 or otherwise generated or modified to embed the corresponding portion(s) of the data in the live gameplay content. As mentioned, any image or video capturing the displayed game content can then potentially be analyzed to locate and extract the data. At least some of this gameplay data can also be stored 616 to a game data repository, or other such location, for subsequent retrieval. As mentioned, in at least some embodiments it will not be practical to embed all relevant information, such that some of the data can be stored in a location that can be identified using the embedded content. The process can continue as long as it is determined 618 that there are more frames of game content to be rendered for the current session, level, etc. Once the session or level is complete, stopped, or otherwise reaches some end criterion, the final game data for that session, level, or stage can be stored 620 to the game data repository or another appropriate location.

Figure 7:
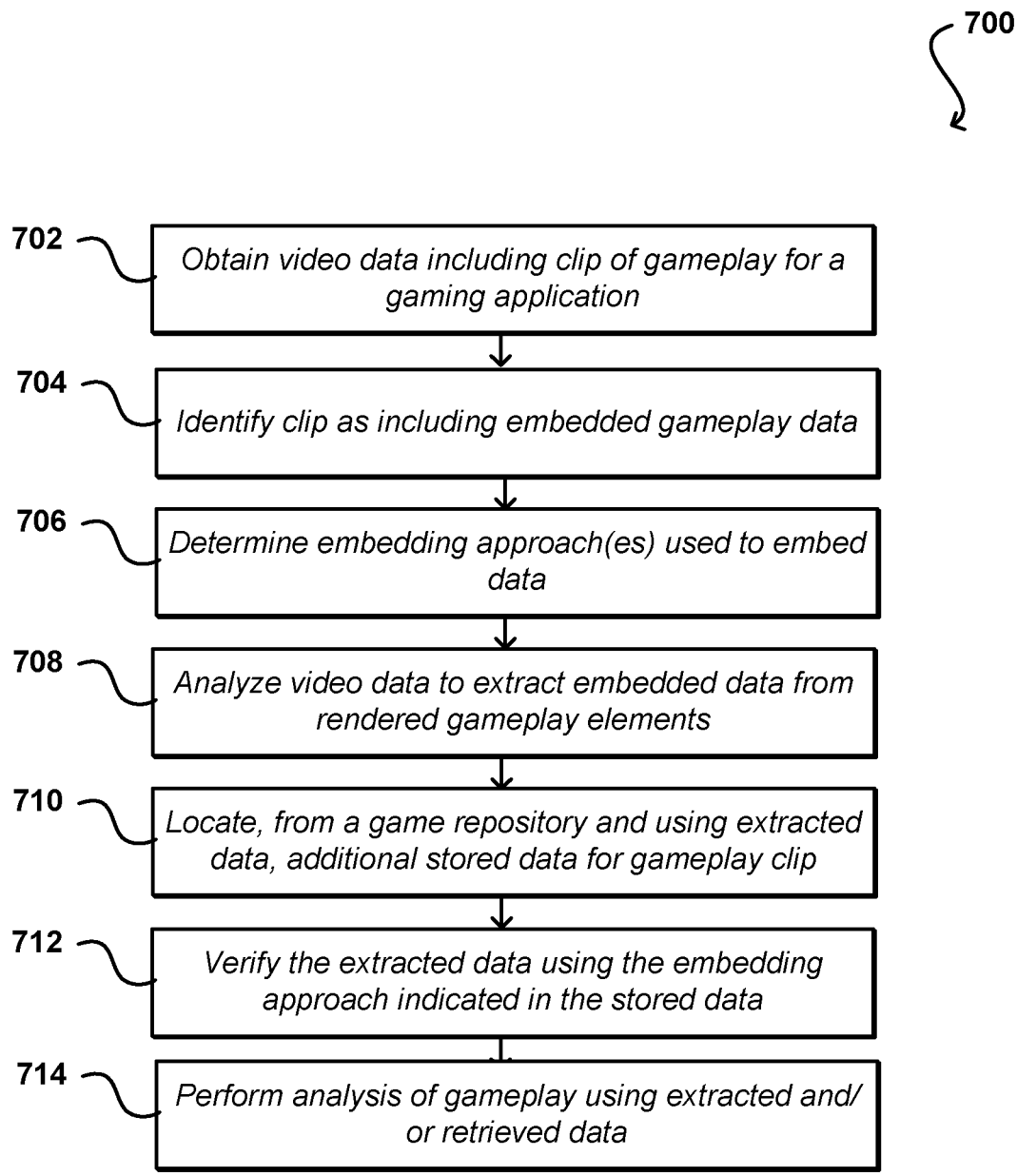
FIG. 7 illustrates an example process for decoding metadata from rendered content that can be utilized in accordance with various embodiments.

FIG. 7 illustrates an example process 700 for extracting embedded data from video of a gameplay session that can be utilized in accordance with various embodiments. In this example, video data is obtained 702 that includes a clip, snippet, or segment of gameplay data for a gaming application. This can include, for example, the gameplay content rendered and displayed on a specific player device utilized by a player for a particular game session. The video clip can have been captured using the player device or another component, and can be obtained from the player, the game developer, a social media site, an issue submission, or another such source as discussed and suggested herein. The video data can be analyzed to identify 704 the clip as including embedded gameplay data. This can include, for example, receiving an indication of the relevant game application or performing computer vision with respect to the video data to identify the relevant game (or other) application. Once identified, one or more aspects of the game can be analyzed to determine that the video data includes embedded data, such as to detect an embedding identifier or other such marker. In other embodiments every rendering of a game may include embedded content, such that recognition of the game application is sufficient to determine the presence of embedded data. For a given gaming application, there may be one or more embedding approaches that are used to embed data, and those approaches can be determined 706 for the corresponding clip. The video data can then be analyzed 708 using any or all of those embedding approaches in order to locate and extract the embedded data from the rendered gameplay elements represented in the video data. As mentioned, this can include identifying the location and configuration of specific elements, colors or patterns used, and the like. In some embodiments there will be a master list or template of elements used to embed specific data, and that list or template can be used to locate the relevant data. As mentioned, it may not be practical to embed all relevant data in the rendered gameplay content. Accordingly, at least some of the embedded data may include an identifier, pointer, or other mechanism that can be used to locate 710 additional stored data for the respective clip. The stored data may also include information about the embedding approach or stored data, which can be used to verify 712 the determined data in at least some embodiments. Once determined, the gameplay data can be used to perform 714 an analysis of the gameplay, such as to identify conditions that lead to a bug or gameplay issue, or to verify the veracity of the clip, among other such options discussed and suggested herein.

Figure 8:
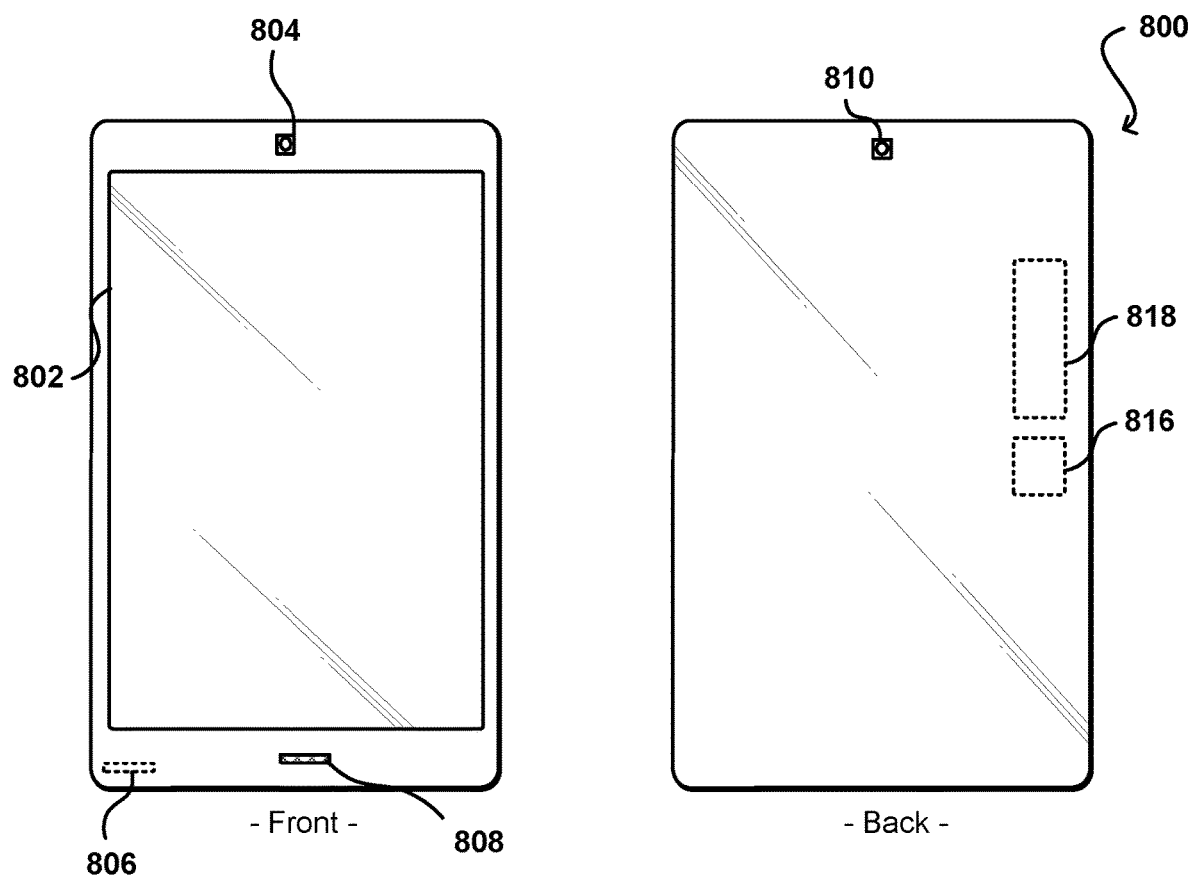
FIG. 8 illustrates an example computing device that can execute a gaming application in accordance with various embodiments.

FIG. 8 illustrates front and back views of an example electronic computing device 800 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, notebook computers, electronic book readers, personal data assistants, cellular phones, video gaming consoles or controllers, television set top boxes, and portable media players, among others.

In this example, the computing device 800 has a display screen 802 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including an image capture element 804 on the front of the device and at least one image capture element 810 on the back of the device. It should be understood, however, that image capture elements could also, or alternatively, be placed on the sides or corners of the device, and that there can be any appropriate number of capture elements of similar or different types. Each image capture element 804 and 810 may be, for example, a camera, a charge-coupled device (CCD), a motion detection sensor or an infrared sensor, or other image capturing technology.

As discussed, the device can use the images (e.g., still or video) captured from the imaging elements 804 and 810 to generate a three-dimensional simulation of the surrounding environment (e.g., a virtual reality of the surrounding environment for display on the display screen of the device). Further, the device can utilize outputs from at least one of the image capture elements 804 and 810 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there is one microphone 808 on the front side of the device. In some devices there may be only one microphone, while in other devices there might be at least one microphone on each side and/or corner of the device, or in other appropriate locations.

The device 800 in this example also includes one or more orientation- or position-determining elements 818 operable to provide information such as a position, direction, motion, or orientation of the device. These elements can include, for example, accelerometers, inertial sensors, electronic gyroscopes, and electronic compasses.

The example device also includes at least one communication mechanism 806, such as may include at least one wired or wireless component operable to communicate with one or more electronic devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

Figure 9:
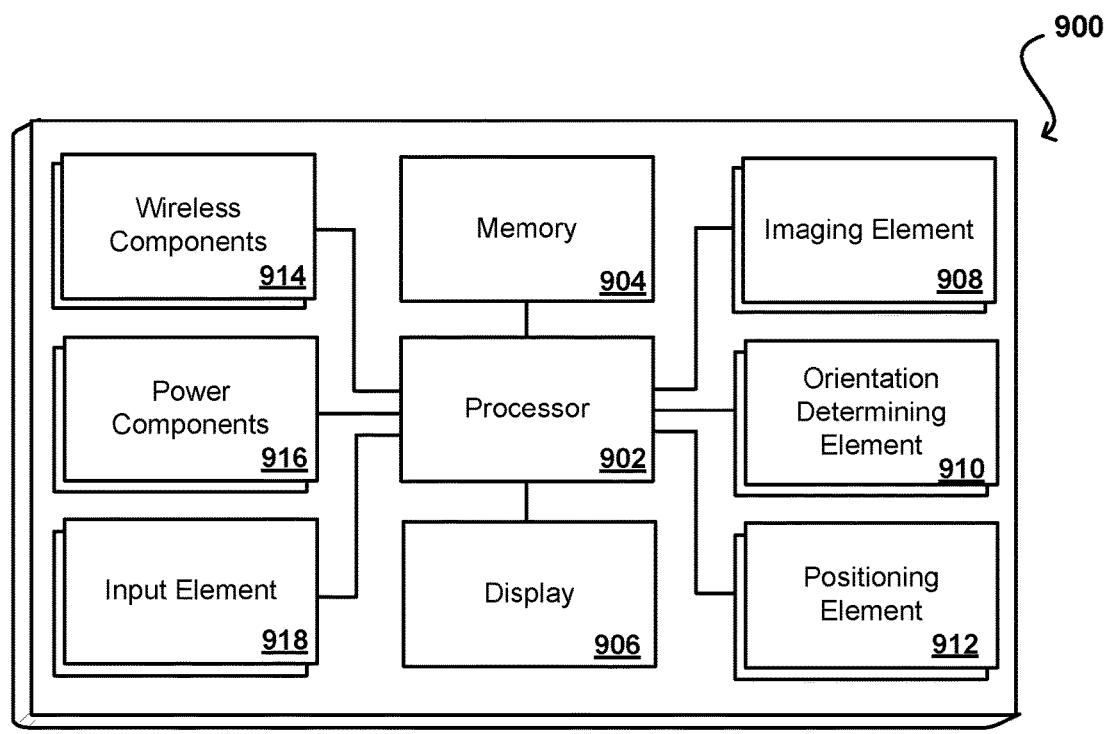
FIG. 9 illustrates example components of a computing device that can be used to implement aspects of the various embodiments.

FIG. 9 illustrates a set of basic components of an electronic computing device 900 such as the device 900 described with respect to FIG. 8. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices.

The device typically will include some type of display screen 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    determining a data value to be embedded in dynamically-generated content, the data value including encoded information relating to performance of a dynamic content application;
    identifying at least one content element contained within a scene of dynamically-generated content and having at least one aspect modifiable to embed the data value;
    dynamically generating the at least one content element with the at least one aspect selected to represent the data value; and
    providing the dynamically-generated content for presentation as part of the dynamic content application.

2. The computer-implemented method of claim 1, further comprising:
    providing the dynamically-generated content for presentation on a first player device, the data value being specific to the first player device; and
    providing second dynamically-generated content for presentation on a second player device, the second dynamically-generated content embedding a second data value using the at least one aspect of the at least one content element, wherein the appearance of the at least one content element on the first device is different than the appearance of the at least one content element on the second device based at least in part upon the respective embedded data value.

3. The computer-implemented method of claim 2, further comprising:
    configuring the second dynamically-generated content such that the embedding of the second data value is imperceptible to a viewer of the second player device absent comparison with the dynamically-generated content on the first player device.

4. The computer-implemented method of claim 1, further comprising:
    receiving video data including a representation of the dynamically-generated content;
    identifying, from the video data, the at least one content element encoding the data value; and
    extracting the data value from the at least one content element in the video data.

5. The computer-implemented method of claim 4, further comprising:
    using the data value to determine one or more aspects of a state of the dynamic content application for purposes of debugging the dynamic content application or verifying a veracity of the video data.

6. The computer-implemented method of claim 4, further comprising:
    using the data value to locate a set of application state data corresponding to at least one of the dynamic content application, a device executing the dynamic content application, or a user associated with the device at the time of the subsequent frame.

7. The computer-implemented method of claim 1, further comprising:
    determining a set of data values, including the data value, to be stored for the dynamic content application;
    determining a set of content elements capable of being dynamically-generated to embed the set of data values; and
    determining at least a subset of the data values to embed in the content elements based at least in part upon at least one of a number or type of content elements in the set.

8. The computer-implemented method of claim 7, further comprising:
    determining at least one encoding scheme to use to embed the set of data values based at least in part upon at least one of the number or type of content elements in the set.

9. The computer-implemented method of claim 1, wherein the dynamically-generated content includes at least one of a player character, non-player character, non-player object, or background element, and wherein the aspect is at least one of a pattern, sound, post-processing result, color palette, texture, size, placement, configuration, or motion.

10. The computer-implemented method of claim 1, further comprising:
    causing the at least one content element to be selected such that the data value is embedded in at least one content element for each frame of the dynamically-generated content.

11. The computer-implemented method of claim 1, wherein the data value includes at least one of a player identifier, device identifier, session identifier, device configuration, network state, game location, game status, or record locator.

12. The computer-implemented method of claim 1, further comprising:
    generating the dynamically-generated content to have a different visual appearance on each device rendering the content, the visual appearance differing based at least in part upon a respective data value embedded in the dynamically-generated content for each device.

13. A system, comprising:
    at least one processor; and
    memory including instructions that, when executed by the at least one processor, cause the system to:
        determine a data value to be embedded in dynamically-generated content the data value including encoded information relating to performance of a dynamic content application;

identify at least one content element contained within a scene of dynamically-generated content and having at least one aspect modifiable to embed the data value;

dynamically generate the at least one content element with the at least one aspect selected to represent the data value; and provide the dynamically-generated content for presentation as part of the dynamic content application.

14. The system of claim 13, wherein the instructions, when executed by the at least one processor, further cause the system to:

provide the dynamically-generated content for presentation on a first player device, the data value being specific to the first player device; and provide second dynamically-generated content for presentation on a second player device, the second dynamically-generated content embedding a second data value using the at least one aspect of the at least one content element, wherein the appearance of the at least one content element on the first device is different than the appearance of the at least one content element on the second device based at least in part upon the respective embedded data value.

15. The system of claim 14, wherein the instructions, when executed by the at least one processor, further cause the system to:

configure the second dynamically-generated content such that the embedding of the second data value is imperceptible to a viewer of the second player device absent comparison with the dynamically-generated content on the first player device.

16. The system of claim 13, wherein the instructions, when executed by the at least one processor, further cause the system to:

receive video data including a representation of the dynamically-generated content;

identify, from the video data, the at least one content element encoding the data value; and extract the data value from the at least one content element in the video data.

17. The system of claim 16, wherein the instructions, when executed by the at least one processor, further cause the system to:

use the data value to determine one or more aspects of a state of the dynamic content application for purposes of debugging the dynamic content application or verifying a veracity of the video data.

18. The system of claim 16, wherein the instructions, when executed by the at least one processor, further cause the system to:

use the data value to locate a set of application state data corresponding to at least one of the dynamic content application, a device executing the dynamic content application, or a user associated with the device at the time of the subsequent frame.

19. The system of claim 13, wherein the instructions, when executed by the at least one processor, further cause the system to:

determine a set of data values, including the data value, to be stored for the dynamic content application associated with the dynamically-generated content;

determine a set of content elements capable of being dynamically-generated to embed the set of data values; and determine at least a subset of the data values to embed in the content elements based at least in part upon at least one of a number or type of content elements in the set.

20. A non-transitory computer readable storage medium storing one or more sequences of instructions executable by one or more processors to perform a set of operations comprising:

determining a data value to be embedded in dynamically-generated content, the data value including encoded information relating to performance of a dynamic content application;

identifying at least one content element contained within a scene of dynamically-generated content and having at least one aspect modifiable to embed the data value;

dynamically generating the at least one content element with the at least one aspect selected to represent the data value; and providing the dynamically-generated content for presentation as part of the dynamic content application.

* * * * *